United States Patent
Vantrease et al.

(10) Patent No.: US 11,960,566 B1
(45) Date of Patent: *Apr. 16, 2024

(54) REDUCING COMPUTATIONS FOR DATA INCLUDING PADDING

(71) Applicant: Amazon Technologies, Inc., Seattle, WA (US)

(72) Inventors: Dana Michelle Vantrease, Austin, TX (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/229,742

(22) Filed: Apr. 13, 2021

Related U.S. Application Data

(63) Continuation of application No. 15/933,339, filed on Mar. 22, 2018, now Pat. No. 10,990,650.

(51) Int. Cl.
*G06F 17/16* (2006.01)
*G06N 3/08* (2023.01)

(52) U.S. Cl.
CPC .............. *G06F 17/16* (2013.01); *G06N 3/08* (2013.01)

(58) Field of Classification Search
CPC ................................. G06F 17/16; G06N 3/08
See application file for complete search history.

(56) References Cited

U.S. PATENT DOCUMENTS

| | | |
|---|---|---|
| 9,691,019 B1 | 6/2017 | Gulland et al. |
| 2016/0350650 A1 | 12/2016 | Leeman-Munk et al. |
| 2018/0096226 A1 | 4/2018 | Aliabadi et al. |
| 2018/0157962 A1 | 6/2018 | Henry et al. |
| 2018/0189981 A1* | 7/2018 | Singh ................. G06F 13/10 |
| 2018/0260690 A1 | 9/2018 | Young et al. |
| 2020/0058106 A1 | 2/2020 | Lazarus et al. |

OTHER PUBLICATIONS

U.S. Appl. No. 15/933,339, Final Office Action, dated Oct. 13, 2020, 11 pages.
U.S. Appl. No. 15/933,339, Non-Final Office Action, dated Apr. 21, 2020, 11 pages.
U.S. Appl. No. 15/933,339, Notice of Allowance, dated Dec. 30, 2020, 8 pages.

* cited by examiner

*Primary Examiner* — Michael D. Yaary
(74) *Attorney, Agent, or Firm* — Kilpatrick Townsend & Stockton LLP

(57) ABSTRACT

Systems and methods are provided to eliminate multiplication operations with zero padding data for convolution computations. A multiplication matrix is generated from an input feature map matrix with padding by adjusting coordinates and dimensions of the input feature map matrix to exclude padding data. The multiplication matrix is used to perform matrix multiplications with respective weight values which results in fewer computations as compared to matrix multiplications which include the zero padding data.

20 Claims, 13 Drawing Sheets

US 11,960,566 B1

REDUCING COMPUTATIONS FOR DATA INCLUDING PADDING

CROSS-REFERENCES TO RELATED APPLICATIONS

This application is a continuation of U.S. patent application Ser. No. 15/933,339, filed Mar. 22, 2018, issued as U.S. Pat. No. 10,990,650 on Apr. 27, 2021, and entitled "Reducing Computations For Data Including Padding," the entire content of which is incorporated herein by reference for all purposes.

BACKGROUND

Artificial neural networks are computing systems with an architecture based on biological neural networks. Artificial neural networks can be trained, using training data, to learn about how to perform a certain computing task. In convolutional neural networks, input feature maps may be convolved with filters across several layers and output feature maps may be generated which represent the convolution outputs. In some implementations, a perimeter of each input feature map may be padded with zeros to effectively increase the size of the corresponding output feature map.

BRIEF DESCRIPTION OF THE DRAWINGS

Various embodiments in accordance with the present disclosure will be described with reference to the drawings, in which.

DETAILED DESCRIPTION

Figure 1:
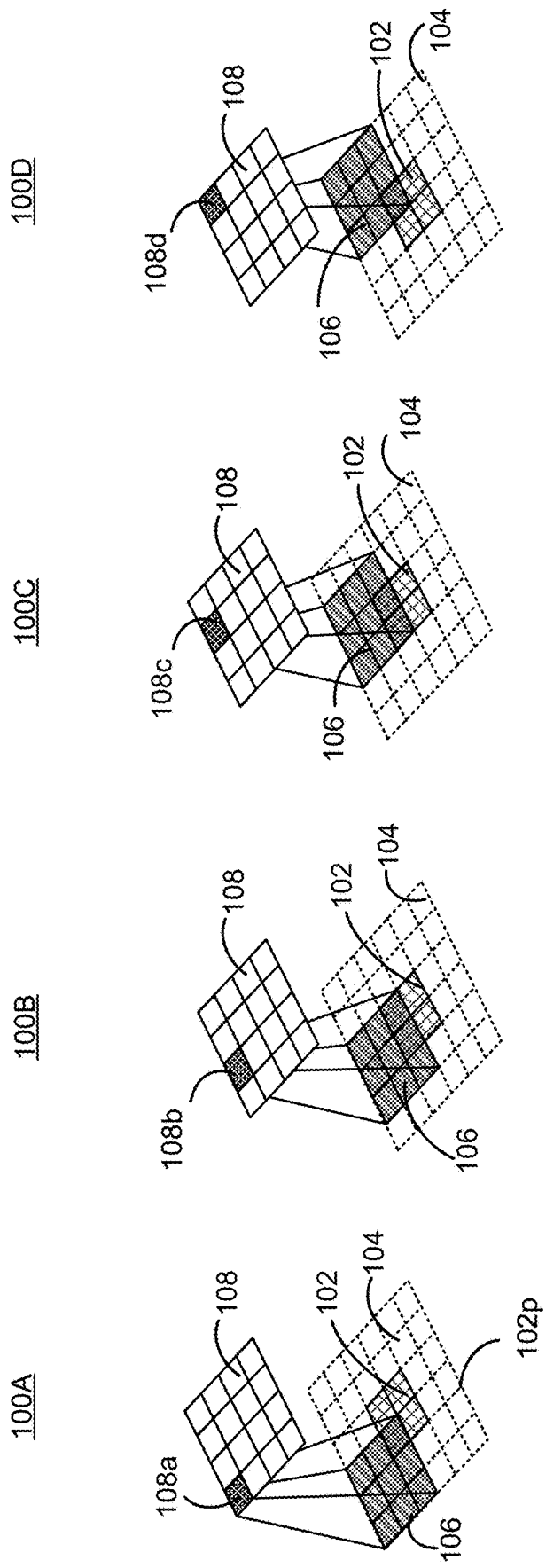
FIGS. 1A, 1B, 1C, and 1D illustrate examples of a convolution filter operating on an input feature map with a padding to generate an output feature map.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In convolutional neural networks, several layers of convolutions may be performed that can multiply-accumulate a two-dimensional filter of weights across an input feature map. In some implementations, a perimeter of the input feature map may be padded with zeros to increase the size of the output feature map. However, use of padding in the convolution may introduce unnecessary computations. Since the padding is typically performed with zero values, multiplying the zero padding value with the filter value results in a zero value. The zero result may not contribute to the overall convolution sum or the output feature map. Furthermore, these computations can waste power and reduce effective performance, and does not have any impact on the final functional result.

Embodiments of the disclosed technologies can provide systems and methods for elimination of zero padding computations to reduce power consumption and improve the performance by minimizing unnecessary computations. In certain embodiments, instructions to be executed by a neural network processor for performing convolution computations can be optimized to skip multiplications with the zero padding data. In some embodiments, the instructions to be executed by the neural network processor may be generated by a compiler which can be optimized to detect the zero padding and skip the multiplications with the zero padding data so that those computations are absent in the compiled code. In other embodiments, the instructions to skip the multiplications with the zero padding data may be generated by hardware. In instances when the zero padding data is stored in the memory alongside with the input feature map elements, the instructions to perform the matrix multiplication can perform address manipulations to avoid the pad addresses. In other instances, where the pads are created dynamically by the instructions, the parameters for the pads can be set to zero.

A convolutional neural network (CNN) is generally a feed-forward artificial neural network. The CNN may include a number of convolutional and subsampling layers optionally followed by one or more fully connected layers. In some instances, the CNN may be configured to transform an original input image layer by layer from original pixel values to a final class score. Each filter can be convolved (e.g., using a sliding window) across a width and height of the input image and respective dot products can be computed between the entries of the filter (e.g., weights) and the input pixels at a given position. As the filter is slid over the width and height of the input image, a two-dimensional feature map (e.g., activation map) may be produced that can provide responses of that filter at every spatial position. Each feature map may then be subsampled typically with mean or max pooling over contiguous regions. Based on the implementation, before or after the subsampling layer an additive bias and sigmoidal nonlinearity may be applied to each feature map. Activation maps may be stacked along the depth dimensions to produce output feature maps. The pooling layer may be used for down sampling operations along with spatial dimensions, e.g., width and height. The fully connected layer may be used to provide the final class score.

A neural network may be implemented using circuitries and data paths, such as a systolic array of processing elements (PEs) capable of performing concurrent arithmetic operations. The systolic array may be part of a computation engine configured to perform convolution computations. In some embodiments, convolution may be performed by a PE in two steps. In a first step, an instruction to load a weight associated with the filter may be executed by the computation engine to shift the weight from a memory into the computation engine. The weight can be cached in the computation engine until a matrix multiplication can be performed. In a second step, an instruction to shift data elements of a patch or a tile of an input feature map may be executed by the computation engine to shift the input data elements from the memory into the computation engine. The computation engine can scale the entire tile of the input feature map by the cached weight by performing the matrix multiplication. By repeating the first and the second steps for the number of weights and accumulating the results from each convolution pass, a complete convolution output feature map can be obtained.

The input feature map may be padded with one or more layers of padding elements around the perimeter of the input feature map to effectively increase the size of the output feature map. The padding elements may include zeros or negligible values. The padding data for the padding elements may be stored in the memory alongside with the input feature map elements or may be generated dynamically for performing matrix multiplications. In certain embodiments, an optimized code generator may determine parameters for the matrix multiplication instructions to be executed by the computation engine based on dimensions of an input feature map matrix comprising input feature map elements, dimensions of a weight matrix comprising weight values, and a size of the padding data. The parameters may provide coordinates and dimensions of a multiplication matrix which may be a subset of the padded input feature map matrix that excludes the padding data. The coordinates of the multiplication matrix may provide a reference point for the location of the multiplication matrix within the padded input feature map matrix. The dimensions of the multiplication matrix may provide a height and a width of the multiplication matrix, which do not include the padding data. The multiplication matrix may be used by the computation engine to perform a matrix multiplication with the respective weight value such that matrix multiplication with the zero padding data (i.e., the padding data comprising zero values for the padding elements) is avoided. Thus, the convolution computations performed using certain embodiments can perform fewer computations by avoiding computations with the zero padding data as compared to computations including the padding data. The optimized code generator may provide the instructions in the form of compiled code which can be executed by the computation engine.

FIGS. 1A, 1B, 1C and 1D illustrate examples of a convolution filter 106 operating on an input data set 102 with a padding 104 to generate an output data set 108. In some implementations, the input data set 102 may correspond to an input feature map and the output data set 108 may correspond to an output feature map. As an example, the input data set 102 may correspond to an input image, an audio clip, a video clip, a text portion, or any other data which may be provided for data processing to identify a certain pattern or an object. The convolution filter 106 may include weight values which may have been pre-determined based on supervised learning, unsupervised learning, or any other method suitable for determining convolutional filters.

As shown in FIGS. 1A-1D, the input data set 102 is represented by a 2×2 matrix which includes four input data set elements or pixels. A padding 104 may be used to frame the input image with two layers of zeros to provide a padded input data set 102p. In some implementations, the padding may be stored in memory alongside with the input data set 102. The filter 106 is represented by a 3×3 matrix which includes nine weight values to operate on a tile of the padded input data set 102p at a time. A different convolution computation can be performed as the filter 106 moves across the input image. For example, the convolution with the filter 106 may start from one corner of the input image as shown in FIG. 1A and move to the right as shown in FIGS. 1B, 1C and 1D. The convolution may further move down by a row of pixels, and then to the right until the bottom right corner is covered, but is not shown here for the purposes of simplicity. The padding 104 can increase the effective dimensions of the input data set 102, which in turn can increase the area that the filter 106 can sweep across, resulting in a larger output data set 108 than a convolution with no padding. For example, as shown in FIGS. 1A-1D, use of the padding 104 can result in a 4×4 output data element matrix comprising sixteen output feature map elements of the output data set 108.

Each convolution operation may scale a given patch or tile of the padded input data set 102p with the given weight to provide a corresponding output data set element by performing a multiply-accumulate operation between the corresponding padded input data set elements and the given weight. In some implementations, a matrix multiplication operation may be performed on a set of the padded input data set elements for each weight of the filter to generate a corresponding output data set element. For example, a convolution operation 100A shown in FIG. 1A may provide an output data set element 108a, a convolution operation 100B shown in FIG. 1B may provide an output data set element 108b, a convolution operation 100C shown in FIG. 1C may provide an output data set element 108c, and a convolution operation 100D shown in FIG. 1D may provide an output data set element 108d. Note that for the given padded input data set 102p, as the filter 106 convolutes across the whole input image from the left top corner to the right bottom corner, sixteen output data set elements corresponding to the output data set 108 may be generated, but are not shown here. In some implementations, the convolution operations may be performed using a computation engine comprising a systolic array as discussed with reference to FIG. 2.

Figure 2:
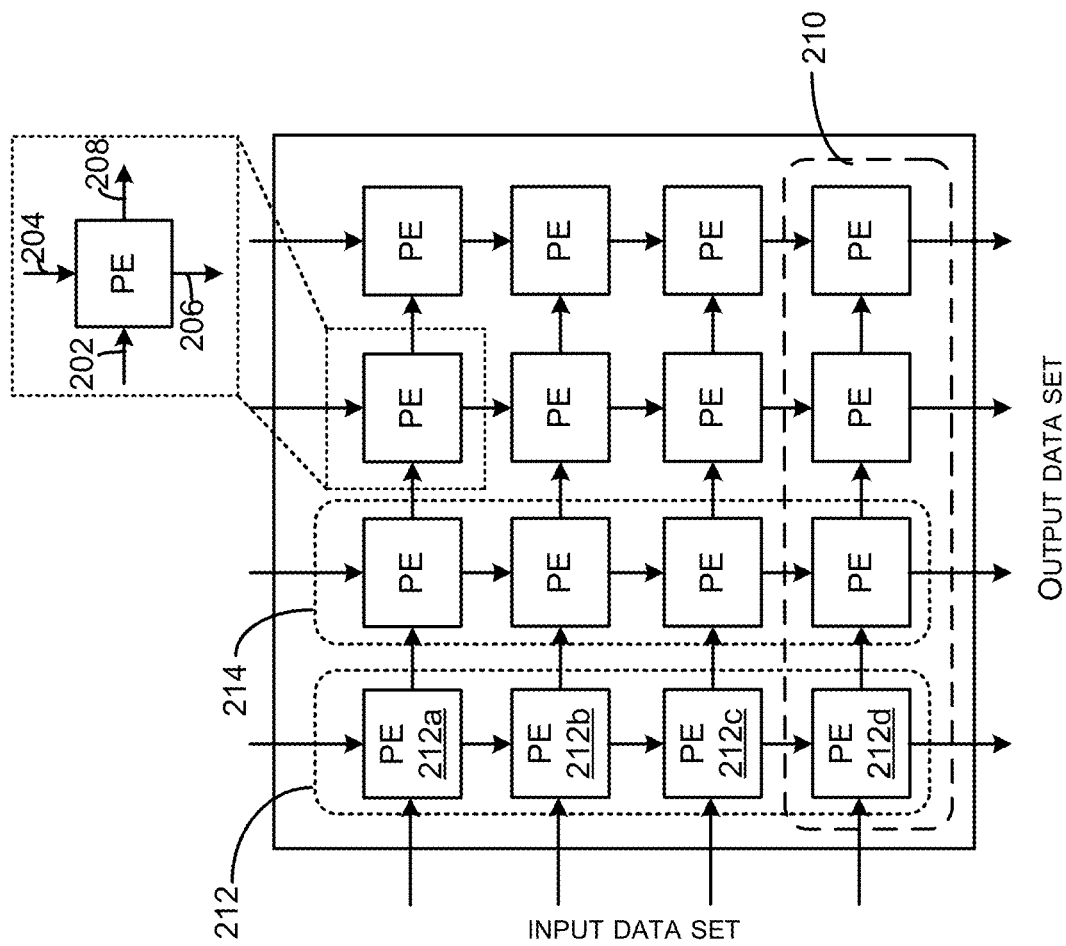
FIG. 2 illustrates an example embodiment of a 4×4 systolic array comprising processing elements.

FIG. 2 illustrates an example embodiment of a 4×4 systolic array 200 comprising PEs. As an example, the systolic array 200 may include four PEs in each row, and four PEs in each column. It will be understood that the systolic array 200 may include any number of PEs in each row and column. Moreover, each PE may include a row input bus 202, a column input bus 204, a column output bus 206, and a row output bus 208. APE may receive inputs from a left PE of the same row (or from external circuitries) via the row input bus 202. The PE may also receive inputs from a PE of the same column above (or from external circuitries) via the column input bus 204. The PE may perform arithmetic operations based on the inputs, and transmit the result of the arithmetic operations to a PE of the same column below (or to the external circuitries) via the column output bus 206. The PE may also forward the inputs received via the row input bus 202 to a right PE of the same row via the row output bus 208.

In some implementations, the systolic array 200 may be configured to perform the arithmetic operations, including multiplications and additions, for the PEs of a neural network. For example, each PE may include arithmetic units such as a multiplier and an adder, or a fused multiplier adder. In the example of FIG. 2, each row of the PEs may be configured to handle one set of input data, and each column of the PEs may generate one set of output data based on the sets of input data received by each PE in a given column. The set of input data may include a tile of the padded input data set 102p. In one implementation, a column 212 of the PEs (the leftmost column) may receive four sets of input data, with each set of input data being handled by one row of the PEs. Each PE in the column 212 may obtain, from the corresponding input data set received via the row input bus 202, an input value and an associated weight value, and multiply the input value with the weight value to generate a scaled input. The input value may include padded input feature map elements from the padded input data set 102p. The scaled inputs generated by the PEs within any column (including the column 112) can be accumulated by the adder of each PE. For example, a PE 212a (of the column 112) may generate a first scaled input (from the first input data set), and transmit the first scaled input to a PE 212b via the column output bus 206 as a partial sum. The PE 212b may also generate a second scaled input (from the second input data set) and add the second scaled input to the partial sum. The updated partial sum, accumulated with the first scaled input and the second scaled input, is then transmitted to a PE 212c via the column output bus 206. The partial sums are updated and propagated across the column 212, and a PE 212d may generate a sum of the scaled inputs from the four input data sets. Moreover, each PE in the column 212 can also propagate the input data sets to other PE columns (e.g., a column 214), which can scale the input data sets with a different set of weights from the column 212. Each column of the PEs can perform the arithmetic operations (multiplications and summations) to generate the output data elements for other PEs in parallel.

In the example of FIG. 2, the systolic array 200 can generate output data elements for four PEs corresponding to the four columns of the systolic array 200. As discussed with reference to FIG. 1, a 3×3 systolic array similar to the systolic array 200 may be used to process an input data set corresponding to the padded input data set 102p and the filter 106 to provide the output data set 108. APE of the systolic array 200 is further explained with reference to FIG. 3.

Figure 3:
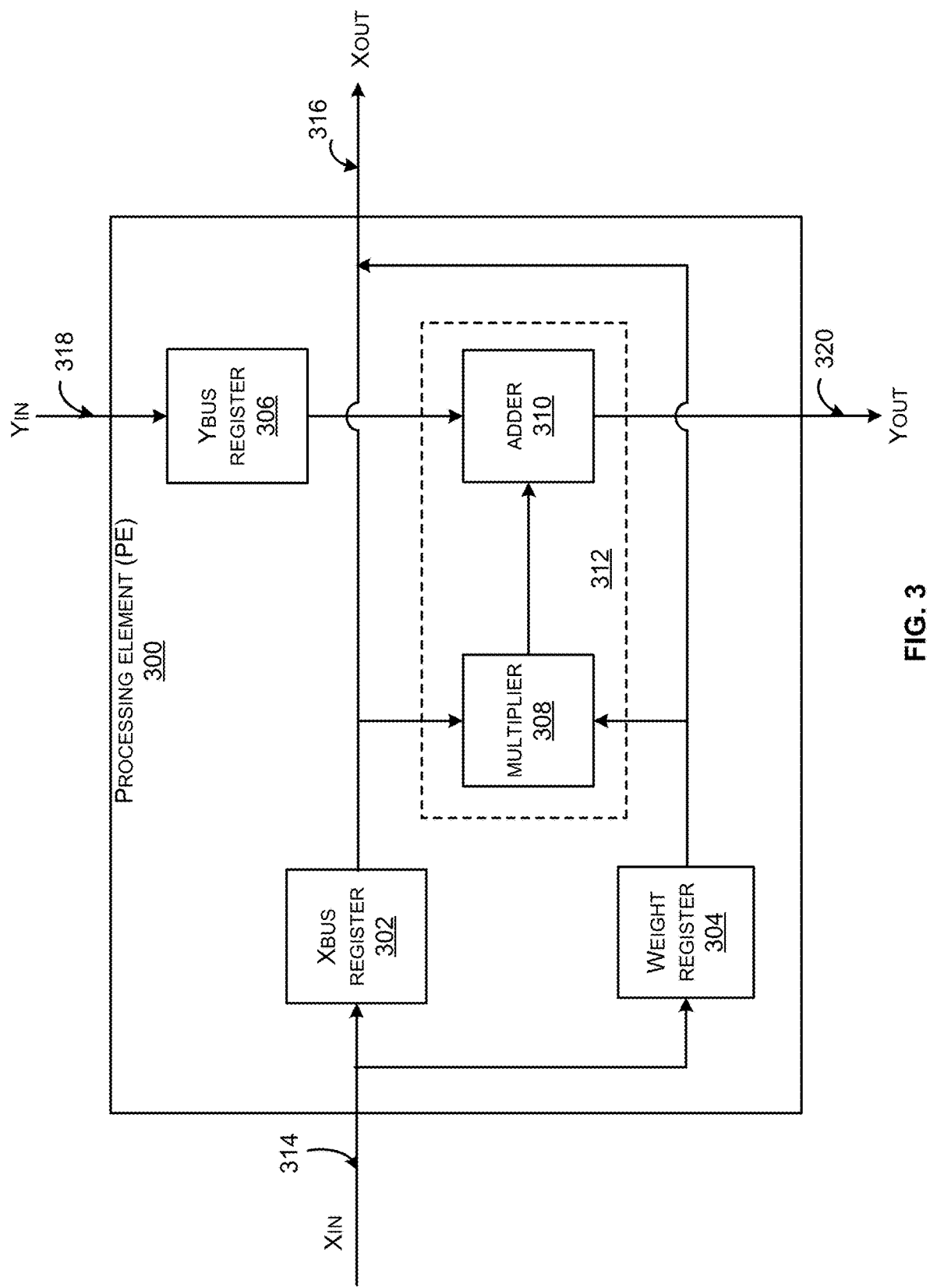
FIG. 3 illustrates an example embodiment of a processing element configured to perform arithmetic operations for convolution computations.

FIG. 3 illustrates an example embodiment of a PE 300 configured to perform arithmetic operations, e.g., multiplication and addition, for convolution computations. The PE 300 may be part of a computation engine comprising a systolic array, e.g., the systolic array 200.

The PE 300 may include an Xbus register 302, a weight register 304, a Ybus register 306, a multiplier 308, and an adder 310. The PE 300 may be configured to receive an input Xin 314 that may include an input data set element, a weight value, and any other control bits (e.g., a data type, an opcode, etc.). Referring back to FIG. 2, the Xin 314 may be similar to the row input bus 202. In some implementations, a splitter (not shown) may be used to split the input Xin 314 into the input data set element to be stored in the Xbus register 302, and the weight value to be stored in the weight register 304. For example, the Xbus register 302 may store an input data set element corresponding to the padded input data set 102p as discussed with reference to FIG. 1. The cached value of the Xin 314 may be provided as an output Xout 316 to a neighboring PE in the array. Referring back to FIG. 2, the Xout 316 may be similar to the row output bus 208. The weight value stored in the weight register 304 may correspond to one of the weight values from a convolution kernel or filter, e.g., the filter 106.

The Ybus register 306 may be configured to store an input Yin 318. Referring back to FIG. 2, the Yin 318 may be similar to the column input bus 204. The input Yin 318 may include a partial sum generated by an upstream neighboring PE in the systolic array, a default value, or another suitable input. For example, in some implementations, the input Yin 318 may be used to load the weights in parallel for all the PEs of the systolic array.

The multiplier 308 may be configured to perform a multiply operation between the cached values of the input data set elements stored in the Xbus register 302 and the weight value stored in the weight register 304. The multiplication result may be added to the cached value of the Yin 318 by the adder 310 to generate an output Yout 320. The output Yout 320 may be provided as a partial sum to a downstream neighboring PE as the Yin 318, or as an output data element corresponding to the output data set for a PE in the last row of the array. Referring back to FIG. 2, the Yout 320 may be similar to the column output bus 206. In certain implementations, the multiplication and addition operations may be fused or integrated together to perform a single step multiply add operation with a single rounding using a fused multiplier adder or fused multiplier accumulator to improve the speed and accuracy of the arithmetic operations. For example, as shown in FIG. 3, a fused multiplier adder (FMA) 312 may be used in place of the multiplier 308 and the adder 310 to perform the multiply and addition operations in a single step.

In some implementations, the Xin 314 data may be stored in a memory coupled to the computation engine. For example, the input data set elements and the weight values may be received from a host device and stored in the memory. In some implementations, the input data set elements stored in the memory may correspond to the padded input data set 102p. An instruction to load weights (e.g., LDWEIGHTS) may be executed to shift one weight at a time from the memory into the computation engine. The weight may be cached in the weight register 304 via the Xin 314 or the Yin 318 until a matrix multiplication operation is performed by the PE 300. Next, an instruction to perform a matrix multiplication (e.g., MATMUL) may be executed to shift an input data set element at a time from the memory via the Xin 314. These two instructions may be repeated for each weight value from the filter 106 and thus an entire tile of the input data set elements may be scaled by the cached weight and results from each pass may be accumulated to perform a complete convolution of the input image. In some implementations, the PEs may then pass the input data set elements and weights to other elements in the systolic array for further processing, e.g., normalization and activation.

Generally, the padding data includes zero values. Thus, the dot products computed between the weight values from the filter 106 and the zero padding data may result in a zero value. For example, as the zero padding data cached into the Xbus register 302 via the Xin 314 is multiplied by the multiplier 308 with the weight value cached in the weight register 304, the multiplier result, which is zero, does not add to the partial sum generated by the adder 310. The zero result does not contribute to the output data set element or the overall convolution sum and may not have any impact on the final functional result. Thus, in most instances, the convolution computations with zero padding data may waste power and reduce effective performance. This is further explained with reference to FIG. 4 and FIG. 5.

Figure 4:
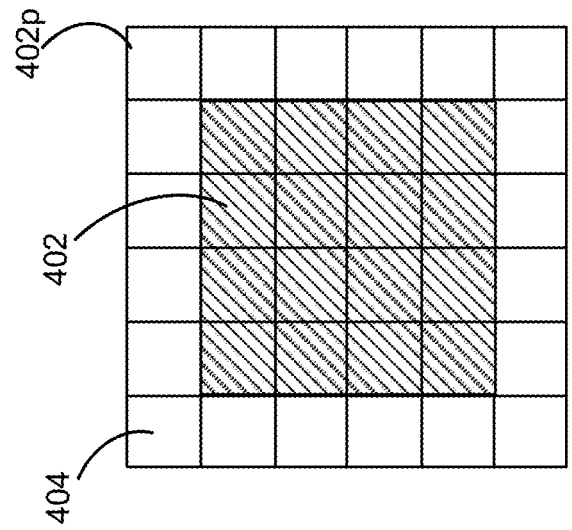
FIG. 4 illustrates an example embodiment of a padded input feature map to be convolved with a filter.

FIG. 4 illustrates an example embodiment of an input data set 402 with a padding 404 to be convolved with a filter 406. The input data set 402 may be represented by a 4×4 matrix comprising sixteen input data set elements. The input data set 402 may include a border of a single layer padding 404 to provide a padded input data set 402p, which can increase the effective dimensions of the input data set 402 to provide a larger output data set. As shown in FIG. 4, the effective dimensions of the input data set 402 with the padding 404 may correspond to a 6×6 matrix with a height equal to six and a width equal to six. Thus, the use of the effective dimensions of the input data set 402 in convolution computations can provide a larger output data set as compared to the output data set generated without the padding 404. As shown in FIG. 4, the padding 404 may include twenty padding elements to surround the input data set 402 with one layer of padding elements on each side of the input data set 402. The filter 406 may include a 3×3 matrix of nine weight values a, b, c, d, e, f, g, h, and i. In some implementations, in order to optimize the memory bandwidth usage, one weight at a time may operate over the width and height of the padded input data set 402p to generate a respective output data element. The respective output data elements may correspond to an output feature map, which can be represented by an output data element matrix. Each weight value of the filter 406 may be convolved with tiles of the padded input data set 402p, as illustrated with reference to FIG. 5.

Figure 5:
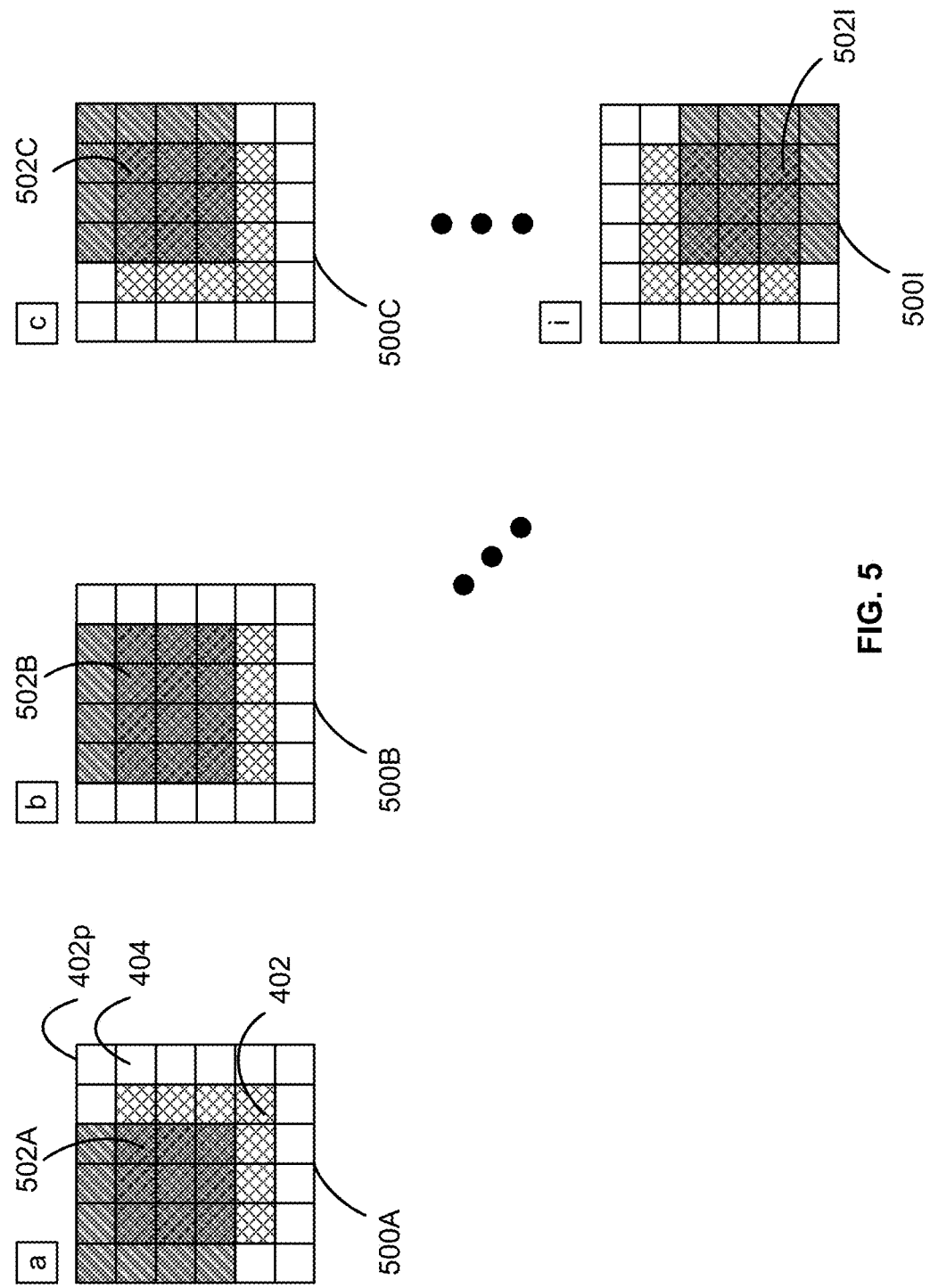
FIG. 5 illustrates an example of convolution of each weight from the filter over the width and height of the input feature map with a padding.

FIG. 5 illustrates an example of convolution of each weight value from the filter 406 over the width and height of the padded input data set 402p. In some implementations, data for the input data set 402, padding 404, and the filter 406 may be stored in a memory coupled to a computation engine. Generally, the zero data for the padding 404 is stored alongside with the input data set 402 and shifted into the computation engine for processing. The computation engine may include an array of PEs, similar to the systolic array 200, as discussed with reference to FIG. 2.

The computation engine may perform a convolution operation in two steps. In a first step, an instruction to load a weight (e.g., LDWEIGHTS) from the filter 406 may be executed to shift the weight from the memory into the computation engine. The weights may be cached in the computation engine until the next step executes. In a second step, another instruction to perform matrix multiplication (e.g., MATMUL) may be executed to shift an input data set element of the padded input data set 402p into the computation engine. For example, the weight and the input data set elements may be shifted into the computation engine via the Xin 314 of the respective PE. Thus, the convolution operation may be performed using the LDWEIGHTS and MATMUL instructions repeatedly for each weight value of the filter 406, as shown below in TABLE 1. Results from each convolution pass may be accumulated via the Yin 318 and Yout 320 of the respective PEs to perform a complete convolution of the input image.

TABLE 1

LDWEIGHTS(weight=a)
MATMUL(coordinates=[0,0], dimensions=[4,4])
LDWEIGHTS(weight=b)
MATMUL(coordinates=[0,1], dimensions=[4,4])
LDWEIGHTS(weight=c)
MATMUL(coordinates=[0,2], dimensions=[4,4])
LDWEIGHTS(weight=d)
MATMUL(coordinates=[1,0], dimensions=[4,4])
LDWEIGHTS(weight=e)
MATMUL(coordinates=[1,1], dimensions=[4,4])
LDWEIGHTS(weight=f)
MATMUL(coordinates=[1,2], dimensions=[4,4])
LDWEIGHTS(weight=g)
MATMUL(coordinates=[2,0], dimensions=[4,4])
LDWEIGHTS(weight=h)
MATMUL(coordinates=[2,1], dimensions=[4,4])
LDWEIGHTS(weight=i)
MATMUL(coordinates=[2,2], dimensions=[4,4])

The LDWEIGHTS instruction may be executed to load each weight value from the filter 406 into the computation engine. The MATMUL instruction may be executed to perform a matrix multiplication of the loaded weight value with a matrix specified using coordinates and dimensions as the parameters of the MATMUL instruction. For example, the coordinates may specify a [row, column] of a tile of the padded input data set 402p with respect to a top leftmost corner of the padded input data set 402p, and the dimensions parameter may specify a height and width of the tile.

As shown in FIG. 5, for a first pass 500A, the weight "a" may operate on a multiplication matrix 502A comprising seven padding elements from the padding 404 and nine input data set elements from the input data set 402. A matrix multiplication may be performed between the weight "a" and the multiplication matrix 502A to provide sixteen multiplication results. For example, as shown in TABLE 1, the MATMUL instruction may include coordinates equal to [0,0] and dimensions equal to [4,4] for the first pass 500A to indicate that the MATMUL instruction is operating on the multiplication matrix 502A which starts at the coordinates [0,0] with respect to the top leftmost corner within the padded input data set 402p. Furthermore, the dimensions [4,4] may indicate that the multiplication matrix 502A is a 4×4 matrix with a height and width equal to four. However, out of the sixteen multiplication results, seven results may be zero since multiplication with the zero padding data for the seven padding elements may result in a zero value.

For a second pass 500B, the weight "b" may operate on a multiplication matrix 502B comprising four padding elements from the padding 404 and twelve input data set elements from the input data set 402. A matrix multiplication may be performed between the weight "b" and the multiplication matrix 502B to provide sixteen multiplication results. For example, as shown in TABLE 1, the MATMUL instruction may include coordinates equal to [0,1] and dimensions equal to [4,4] for the second pass 500B to indicate that the MATMUL instruction is operating on the multiplication matrix 502B which starts at the coordinates [0,1] with respect to the top leftmost corner within the padded input data set 402p. However, out of the sixteen multiplication results, four results may be zero since multiplication with the zero padding data for the four padding elements may result in a zero value.

For a third pass 500C, the weight "c" may operate on a multiplication matrix 502C comprising seven padding elements from the padding 404 and nine input data set elements from the input data set 402. A matrix multiplication may be performed between the weight "c" and the multiplication matrix 502C to provide sixteen multiplication results. For example, as shown in TABLE 1, the MATMUL instruction may include coordinates equal to [0,2] and dimensions equal to [4,4] for the third pass 500C to indicate that the MATMUL instruction is operating on the multiplication matrix 502C which starts at the coordinates [0,2] with respect to the top leftmost corner within the padded input data set 402p. However, out of the sixteen multiplication results, seven results may be zero since multiplication with the zero padding data for the seven padding elements may result in a zero value.

For a ninth pass 500I, the weight "i" may operate on a multiplication matrix 502I comprising seven padding elements from the padding 404 and nine input data set elements from the input data set 402. A matrix multiplication may be performed between the weight "i" and the multiplication matrix 502I to provide sixteen multiplication results. For example, as shown in TABLE 1, the MATMUL instruction may include coordinates equal to [2,2] and dimensions equal to [4,4] for the ninth pass 500I to indicate that the MATMUL instruction is operating on the multiplication matrix 502I which starts at the coordinates [2,2] with respect to the top leftmost corner within the padded input data set 402p. However, out of the sixteen multiplication results, seven results may be zero since multiplication with the zero padding data for the seven padding elements may result in a zero value. Thus, as discussed with reference to FIG. 5, multiple unnecessary computations may be performed using the zero padding data in convolution computations, which can waste power and reduce effective performance.

Some embodiments of the disclosed technologies may allow computations with only input data set elements without the padding data to avoid unnecessary computations with zero padding data to improve the performance as well as reduce power consumption. Embodiments of the disclosed technologies can provide methods and systems to generate instructions to be executed by the computation engine such that the matrix multiplications with the zero padding data can be removed or skipped. This is further explained with reference to FIG. 6 and FIG. 7.

Figure 6:
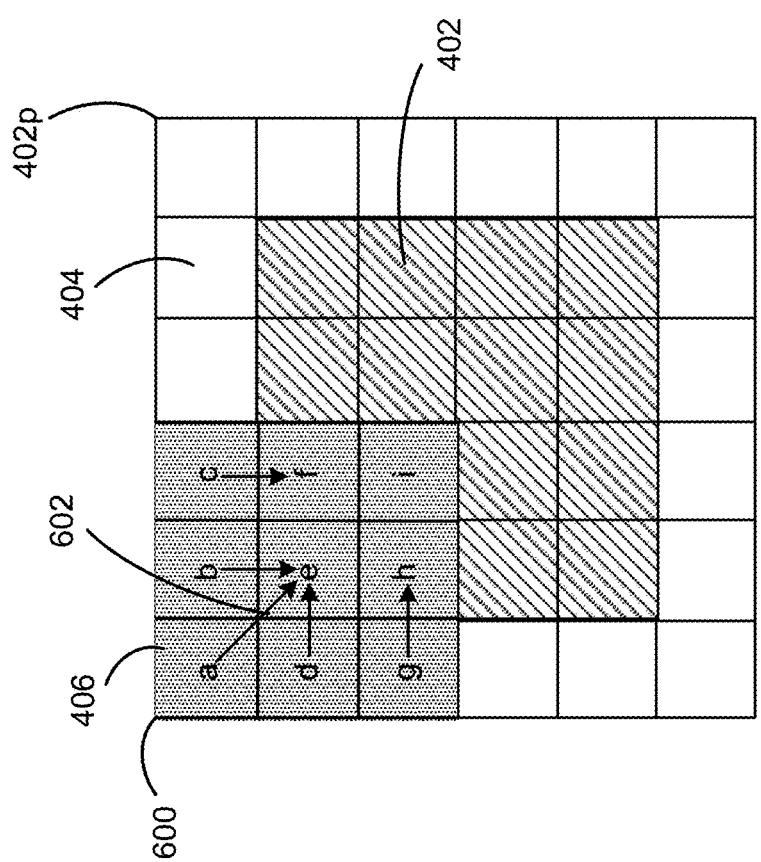
FIG. 6 illustrates reassignment of coordinates for matrix multiplication to avoid computations with zero padding data, in some embodiments.

FIG. 6 illustrates reassignment of coordinates for matrix multiplication to avoid computations with zero padding data, in some embodiments. The convolution of each weight value from the filter 406 over the width and height of the padded input data set 402p can be performed by excluding padding data for the computations. In one embodiment, data for the padding 404 may not be stored in the memory to minimize the memory usage. Thus, the input data set elements shifted into the computation engine may only include data elements for the input data set 402, and not for the padding 404. Referring back to FIG. 3, the Xin 314 may only include the data for the input data set 402 and the filter 406 for each PE in the array.

In some embodiments, the coordinates and dimensions of each tile of the padded input data set 402p that a weight operates on can be adjusted to avoid computations with the zero padding data. For example, padded coordinates and padded dimensions for a given tile of the padded input data set 402p may be determined based on effective dimensions of the input data set 402 with the padding 404. For example, the effective dimensions of the input data set 402 with the padding 404 may include a height and a width, each equal to six, for the padded input data set 402p as shown in FIG. 0.6. The padded coordinates for the given tile may be specified relative to a top leftmost corner 600 of the padded input data set 402p, e.g., a first row and a first column of the padded input data set 402p. The padded dimensions for the given tile may include the height and the width of the subset of the padded input data set 402p, and may be determined using the height and the width of the input data set 402 with the padding 404. The padded dimensions may include the padding 404 on each side of the given tile, as needed.

Next, the padded coordinates and the padded dimensions for the given tile of the padded input data set 402p may be reassigned such that a height and a width of the given tile do not extend into the padding 404, and the coordinates are relative to a top leftmost corner 602 (e.g., a first row and a first column) of the input data set 402. For example, as shown in FIG. 6, the coordinates to be used by the matrix multiplication instruction may be adjusted to be reassigned to the top leftmost left corner of the input data set 402 by excluding the padding data. In some embodiments, the reassignment of the coordinates may be determined based on the amount of padding around the input data element matrix and the coordinates of the weight in the matrix for the filter 406. For example, the weights a, b, d, and e may be reassigned the coordinates as [0,0] since that may be the location of their first non-pad convolution. The [0,0] coordinates may correspond to a first row and a first column of the input data set 402. On the other hand, the weights e, f, h, and i may not need any adjustment because they are already on a data set element for the first convolution. The dimensions of the tile may also be adjusted to reflect the input data elements without the pads. This is further explained with reference to FIG. 7.

Figure 7:
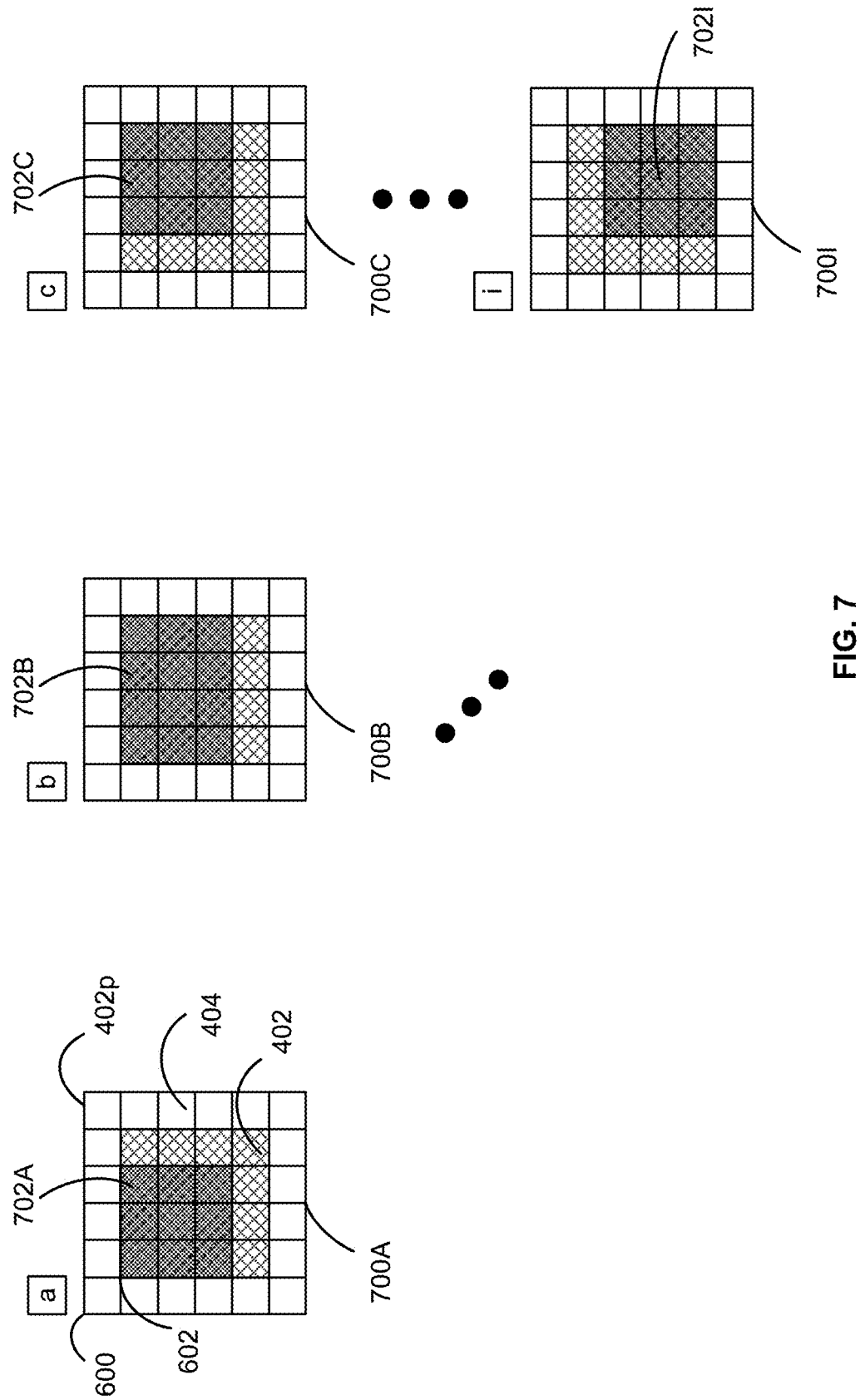
FIG. 7 illustrates reassignment of dimensions for matrix multiplication to avoid computations with zero padding data in different convolution passes, in some embodiments.

FIG. 7 illustrates reassignment of the coordinates and the dimensions for the matrix multiplication to avoid computations with the zero padding data in different convolution passes, in some embodiments.

In certain embodiments, padded coordinates and padded dimensions for a first subset of the padded input data set 402p may be determined, to be used with the weight "a", based on the effective dimensions of the input data set 402. As discussed with reference to FIG. 4, the effective dimensions of the input data set 402 may include the dimensions of the input data set 402 with the padding 404. For example, with reference to FIG. 5, the padded coordinates and the padded dimensions for the first subset of the padded input data set 402p (e.g., a 4×4 tile similar to the multiplication matrix 502A) may include coordinates [0,0] with reference to the top leftmost corner 600 of the padded input data set 402p, and the dimensions [4,4]. According to certain embodiments, the padded coordinates and the padded dimensions for the first subset of the padded input data set 402p may be reassigned to provide the coordinates and the dimensions for a multiplication matrix 702A such that the height and the width of the multiplication matrix 702A do not extend into the padding 404, and the coordinates are relative to the top leftmost corner 602 of the input data set 402. As shown in FIG. 7, for a first pass 700A, the coordinates generated for the matrix multiplication may be reassigned to start at [0,0] with respect to the top leftmost corner of the input data set 402 which excludes the padding 404. Additionally, as shown by the multiplication matrix 702A, the dimensions generated for the matrix multiplication instruction may be reassigned to [3,3] to indicate that the weight "a" may operate on nine input data set elements within the input data set 402. Thus, the matrix multiplication performed between the weight "a" and the multiplication matrix 702A may only provide nine multiplication results by skipping unnecessary computations with zero padding data.

Padded coordinates and padded dimensions for a second subset of the padded input data set 402p may be determined, to be used with the weight "b", based on the effective dimensions of the input data set 402. For example, with reference to FIG. 5, the padded coordinates and the padded dimensions for the second subset of the padded input data set 402p (e.g., a 4×4 tile similar to the multiplication matrix 502B) may include coordinates [0,1] with reference to the top leftmost corner 600 of the padded input data set 402p, and the dimensions [4,4]. The padded coordinates and the padded dimensions for the second subset of the padded input data set 402p may be reassigned to provide the coordinates and the dimensions for a multiplication matrix 702B such that the height and the width of the multiplication matrix 702B do not extend into the padding 404, and the coordinates are relative to the top leftmost corner 602 of the input data set 402. As shown in FIG. 7, for a second pass 700B, the coordinates generated for the matrix multiplication may be reassigned to start at [0,0] with respect to the top leftmost corner of the input data set 402 which excludes the padding 404. Additionally, as shown by the multiplication matrix 702B, the dimensions generated for the matrix multiplication instruction may be reassigned to [4,3] to indicate that the weight "b" may operate on twelve input data set elements within the input data set 402. Thus, the matrix multiplication performed between the weight "b" and the multiplication matrix 702B may only provide twelve multiplication results by skipping unnecessary computations with zero padding data.

Padded coordinates and padded dimensions for a third subset of the padded input data set 402p may be determined, to be used with the weight "c", based on the effective dimensions of the input data set 402. For example, with reference to FIG. 5, the padded coordinates and the padded dimensions for the third subset of the padded input data set 402p (e.g., a 4×4 tile similar to the multiplication matrix 502C) may include coordinates [0,2] with reference to the top leftmost corner 600 of the padded input data set 402p, and the dimensions [4,4]. The padded coordinates and the padded dimensions for the third subset of the padded input data set 402p may be reassigned to provide the coordinates and the dimensions for a multiplication matrix 702C such that the height and the width of the multiplication matrix 702C do not extend into the padding 404, and the coordinates are relative to the top leftmost corner 602 of the input data set 402. As shown in FIG. 7, for a third pass 700C, the coordinates generated for the matrix multiplication may be reassigned to start at [0,1] with respect to the top leftmost corner of the input data set 402 which excludes the padding 404. Additionally, as shown by the multiplication matrix 702C, the dimensions generated for the matrix multiplication instruction may be reassigned to [3,3] to indicate that the weight "c" may operate on nine input data set elements within the input data set 402. Thus, the matrix multiplication performed between the weight "c" and the multiplication matrix 702C may only provide nine multiplication results by skipping unnecessary computations with zero padding data.

Padded coordinates and padded dimensions for a ninth subset of the padded input data set 402p may be determined, to be used with the weight "i", based on the effective dimensions of the input data set 402. For example, with reference to FIG. 5, the padded coordinates and the padded dimensions for the ninth subset of the padded input data set 402p (e.g., a 4×4 tile similar to the multiplication matrix 502I) may include coordinates [2,2] with reference to the top leftmost corner 600 of the padded input data set 402p, and the dimensions [4,4]. The padded coordinates and the padded dimensions for the ninth subset of the padded input data set 402p may be reassigned to provide the coordinates and the dimensions for a multiplication matrix 702I such that the height and the width of the multiplication matrix 702I do not extend into the padding 404, and the coordinates are relative to the top leftmost corner 602 of the input data set 402. As shown in FIG. 7, for a ninth pass 700I, the coordinates generated for the matrix multiplication may be reassigned to start at [1,1] with respect to the top leftmost corner within the input data set 402 which excludes the padding 404. Additionally, as shown by the multiplication matrix 702I, the dimensions generated for the matrix multiplication instruction may be reassigned to [3,3] to indicate that the weight "i" may operate on nine input data set elements within the input data set 402. Thus, the matrix multiplication performed between the weight "i" and the multiplication matrix 702A may only provide nine multiplication results by skipping unnecessary computations with zero padding data.

The adjusted coordinates and dimensions to perform the matrix multiplication between the padded input data set 402p and the filter 406 for different convolution passes as described above are listed in TABLE 2.

TABLE 2

LDWEIGHTS(weight=a)
MATMUL(coordinate=[0,0], dimensions=[3,3])
LDWEIGHTS(weight=b)
MATMUL(coordinate=[0,0], dimensions=[4,3])
LDWEIGHTS(weight=c)
MATMUL(coordinate=[0,1], dimensions=[3,3])
LDWEIGHTS(weight=d)
MATMUL(coordinate=[0,0], dimensions=[3,4])
LDWEIGHTS(weight=e)
MATMUL(coordinate=[0,0], dimensions=[4,4])
LDWEIGHTS(weight=f)
MATMUL(coordinate=[0,1], dimensions=[3,4])
LDWEIGHTS(weight=g)
MATMUL(coordinate=[1,0], dimensions=[3,3])
LDWEIGHTS(weight=h)
MATMUL(coordinate=[1,0], dimensions=[4,3])
LDWEIGHTS(weight=i)
MATMUL(coordinate=[1,1], dimensions=[3,3])

Thus, in certain embodiments, a full convolution operation by skipping the computations with the zero padding data may perform a lower number of computations (e.g., 100 computations with reference to TABLE 2) as compared to including zero padding data (e.g., 144 computations with reference to TABLE 1). Skipping the computations with the zero padding data may not have any impact on the final functional result since the zero result does not contribute to the output data set element or the overall convolution sum. Thus, skipping the convolution computations with zero padding data may improve effective performance and reduce power consumption. Note that even though some embodiments are discussed with two-dimensional input data sets or matrices, it will be understood that the embodiments can be used for computations with multi-dimensional arrays or tensors with multi-dimensional paddings (e.g., cubes) without deviating from the scope of the disclosed technologies. The convolution computations may be performed by a neural network processor comprising the computation engine, as discussed with reference to FIG. 8.

Figure 8:
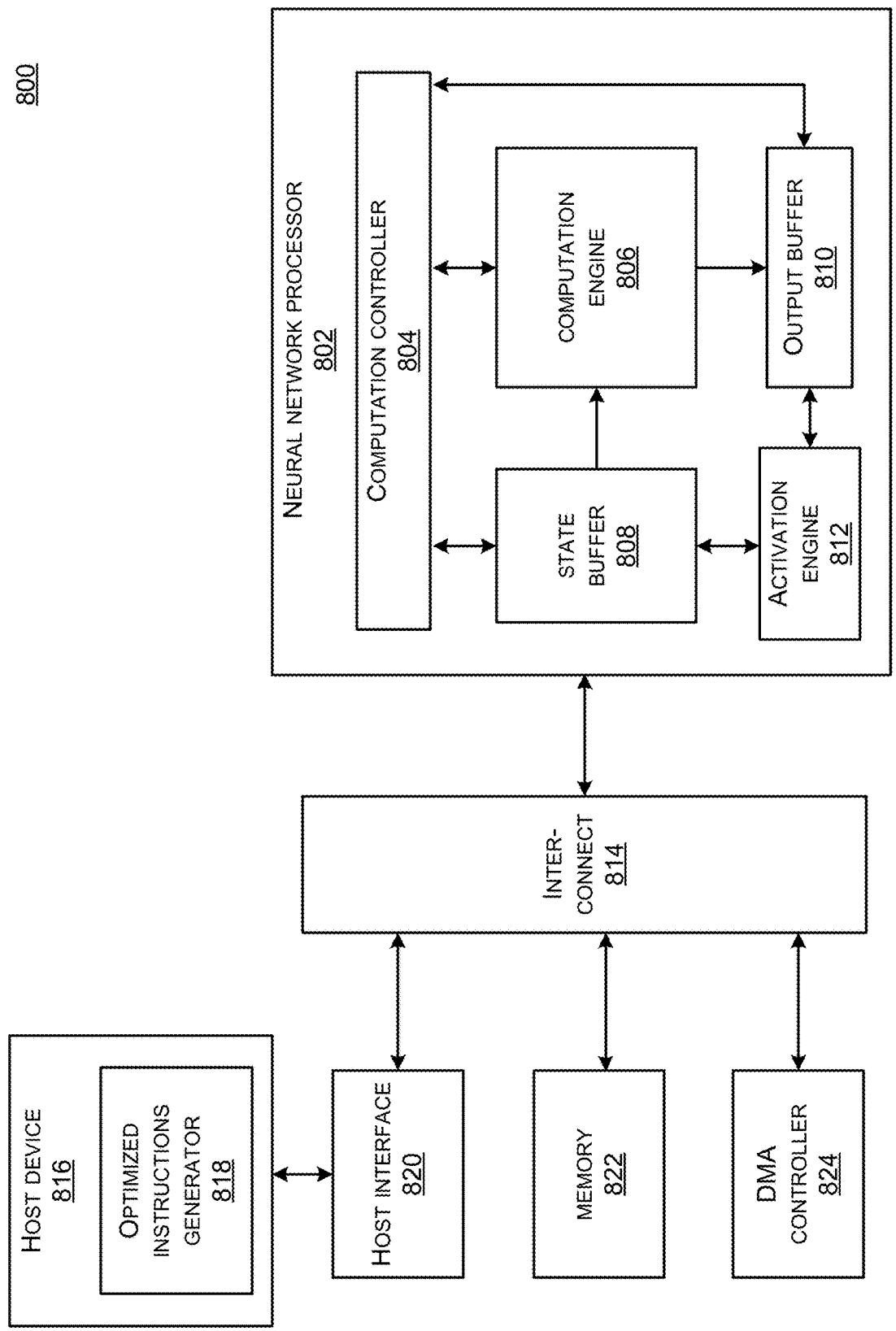
FIG. 8 shows an example apparatus for neural network computations according to some embodiments of the disclosed technologies.

FIG. 8 shows an example apparatus 800 for neural network computations according to some embodiments of the disclosed technologies. The apparatus 800 may include a neural network processor 802 coupled to a host interface 820, memory 822, and a direct memory access (DMA) controller 824 via an interconnect 814. The interconnect 814 may be an AXI interface or any suitable interface. In some implementations, the apparatus 800 may be part of a computer system. For example, the computer system may be configured to provide multi-tenant compute services for data processing applications such as an image recognition service, text-based data processing (e.g., processing of search queries), audio or video data processing, etc. The apparatus 800 may provide computing and memory resources for the convolution computations. Some embodiments may be described with reference to neural networks, however it will be understood that certain embodiments may be used in other applications, e.g., pattern recognition, image processing, computer vision, etc., without deviating from the scope of the technologies.

The host interface 820 may be configured to enable communication between a host device 816 and the neural network processor 802. For example, the host interface 820 may be configured to transmit memory descriptors including the memory addresses of the stored data (e.g., input data sets, weights, results of computations, etc.) between the host device 816 and the neural network processor 802. The host interface 820 may include, e.g., a peripheral component interconnect express (PCIe) interface, or any suitable interface for communicating with the host device 816.

The host device 816 may include an optimized instructions generator 818 to generate instructions to be executed by the neural network processor 802. Note that the host device 816 may include other components, e.g., a processor, memory, etc., which are not shown here for the purposes of simplicity. In some instances, the host device 816 may use the convolution results provided by the neural network processor 802 for inferences or predictions about a pattern or an object from a given input data set.

In some embodiments, the instructions generated by the optimized instructions generator 818 may be in the form of compiled code which can be executed by the neural network processor 802. In some implementations, computer code generated by the optimized instructions generator 818 may be compiled offline and stored in the memory 822. The optimized instructions generator 818 may be configured to receive information associated with an input data element matrix, a weight matrix, and the padding to surround the input data element matrix. For example, the information associated with the input data element matrix may include dimensions of the input data element matrix, and the information associated with the weight matrix may include dimensions of the weight matrix. The information associated with the padding may include a size of the padding data to surround the input data element matrix. In some implementations, the dimensions for the input data element matrix, the weight matrix, and the padding size may be provided by a user, e.g., by programming one or more registers in the host device. The optimized instructions generator 818 may be further configured to determine, for each weight value from the weight matrix, coordinates and dimensions for a respective multiplication matrix using the first dimensions, the second dimensions and the size information. The respective multiplication matrix may correspond to a subset of a padded input data element matrix which excludes the padding data. The respective multiplication matrix may be used by the neural network processor 802 for performing a matrix multiplication with the respective weight value. In some embodiments, the instructions generated by the optimized instructions generator 818 may be stored in the memory 822 using the host interface 820.

The memory 822 may be configured to store instructions, input data sets (e.g., pixel data of an image), and the weights (e.g., weights corresponding to certain visual and/or non-visual features) received from the host device 816. In certain embodiments, the input data sets stored in the memory 822 may not include the zero padding data to reduce the memory usage. The memory 822 may also be configured to store outputs of the neural network processor 802 (e.g., one or more image recognition decisions on the input images in the form of output feature maps or data sets) that may be used by the host device 816 to make predictions about the input image. The memory 822 may include any suitable memory, e.g., dynamic random access memory (DRAM), synchronous DRAM (SDRAM), double data rate DRAM (DDR DRAM), storage class memory (SCM), flash memory, etc.

The DMA controller 824 may be configured to perform DMA operations to transfer data between the neural network processor 802 and the host device 816. For example, as discussed above, the host device 816 can store the instructions, input data sets, and the weights in the memory 822. The host device 816 can provide the memory addresses for the stored instructions, data, and the weights to the neural network processor 802 (e.g., in the form of memory descriptors). The neural network processor 802 can then obtain the stored instructions, data, and the weights based on the memory addresses provided by the host device 816. The neural network processor 802 can also store the results of computations (e.g., one or more image recognition decisions) in the memory 822, and provide the memory addresses for the stored results to the host device 816.

The neural network processor 802 may include a computation controller 804, a computation engine 806, a state buffer 808, an output buffer 810, and an activation engine 812. As to be discussed in more detail, the neural network processor 802 can provide the computing resources to support the computations for different convolution layers. For example, as discussed above, the instructions, input data sets, and the weights may be stored in the memory 822. The host device 816 can provide the memory addresses for the stored instructions, input data sets, and the weights to the neural network processor 802 (e.g., in the form of memory descriptors). The neural network processor 802 can then obtain the stored instructions, input data sets, and the weights based on the memory addresses provided by the host device 816. The neural network processor 802 can also store the results of computations (e.g., one or more image recognition decisions) in the memory 822, and provide the memory addresses for the stored results to the host device 816. The neural network processor 802 may be implemented as a system on chip (SoC), a field programmable gate array (FPGA), or any suitable circuit.

The state buffer 808 may be configured to provide caching of data used for computations at the computation engine 806. The data cached at the state buffer 808 may include the input data sets and the weights acquired from the memory 822, as well as intermediate outputs of computations at the computation engine 806. The caching can reduce the effect of memory access bottleneck (e.g., caused by the latencies at the memory 822, the DMA controller 824, the interconnect 814, etc.) on the performance of the computation engine 806. The state buffer 808 may also be configured to store the instructions to be executed by the computation engine 806. The state buffer 808 can be an on-chip memory device and may include a static random access memory (SRAM) or any suitable memory.

The computation controller 804 may be configured to provide controls to various components of the neural network processor 802 to perform convolution computations. In some implementations, the computation controller 804 may read the instructions stored in the memory 822 and store them in an instruction buffer. The computation controller 804 may decode the instructions and schedule the executions of the instructions by the computation engine 806. For example, the computation controller 804 may decode an instruction to load the weights from the state buffer 808 and may schedule loading of the weights into the computation engine 806. The computation controller 804 may also decode an instruction to read a set of input data elements from the state buffer 808 to shift into the computation engine 806 to perform a matrix multiplication with the given parameters.

The computation engine 806 may be configured to perform computations for the neural network. In some embodiments, the computation engine 806 may include a systolic array comprising a set of PEs, similar to the systolic array 200, configured to perform one or more arithmetic operations involved in the neural network computations. Each PE may perform matrix multiplication and matrix convolution using input data sets and associated weights. The computation engine 806 may execute instructions as scheduled by the computation controller 804 to load weights and the input data sets from the state buffer 808 into the computation engine 806. Each PE in the computation engine 806 may be similar to the PE 300 and perform matrix multiplication of the input data sets and the weights as discussed with reference to FIG. 3. For example, the input data set elements corresponding to the input data set 402 and the weight values from the filter 406 may be read from the state buffer 808 to execute the matrix multiplication instruction. In some instances, the input data set elements may correspond to a tile or a patch of the input data set 402 to be convolved with a weight value from the filter 406. The coordinates for the matrix multiplication instruction to generate the respective multiplication matrix may include a start address of the given multiplication matrix within the input data set 402. For example, the start address may correspond to an address of the state buffer 808, the memory 822, or a local memory in the computation engine 806 at which a first element of the tile may be stored. Each PE may reduce the number of matrix multiplication computations by skipping multiplication computations with zero padding data thus improving performance. The computation engine 806 may provide the computations results to be stored in the output buffer 810.

The output buffer 810 may include a set of registers to store the output data sets generated by the computation engine 806. The output buffer 810 may also enable additional processing such as a pooling operation to reduce the size of the stored outputs. In some implementations, the computation engine 806 can be operated to perform computations for a particular convolution layer, and the output buffer 810 can process the outputs of that convolution layer and store the processed output data sets (with or without processing by the activation engine 812) at the state buffer 808.

The activation engine 812 may be configured to apply one or more activation functions (e.g., ReLu function) on the output of the output buffer 810. For example, the activation engine 812 may include one or more lookup tables (e.g., in the form of multiplexer circuits) that can map the input to one of the candidate outputs representing the result of applying the activation function to the input. In some examples, the activation engine 812 may also include a bypass path to allow outputs from the output buffer 810 to be stored directly at the state buffer 808 when activation functions are not to be applied.

Figure 9:
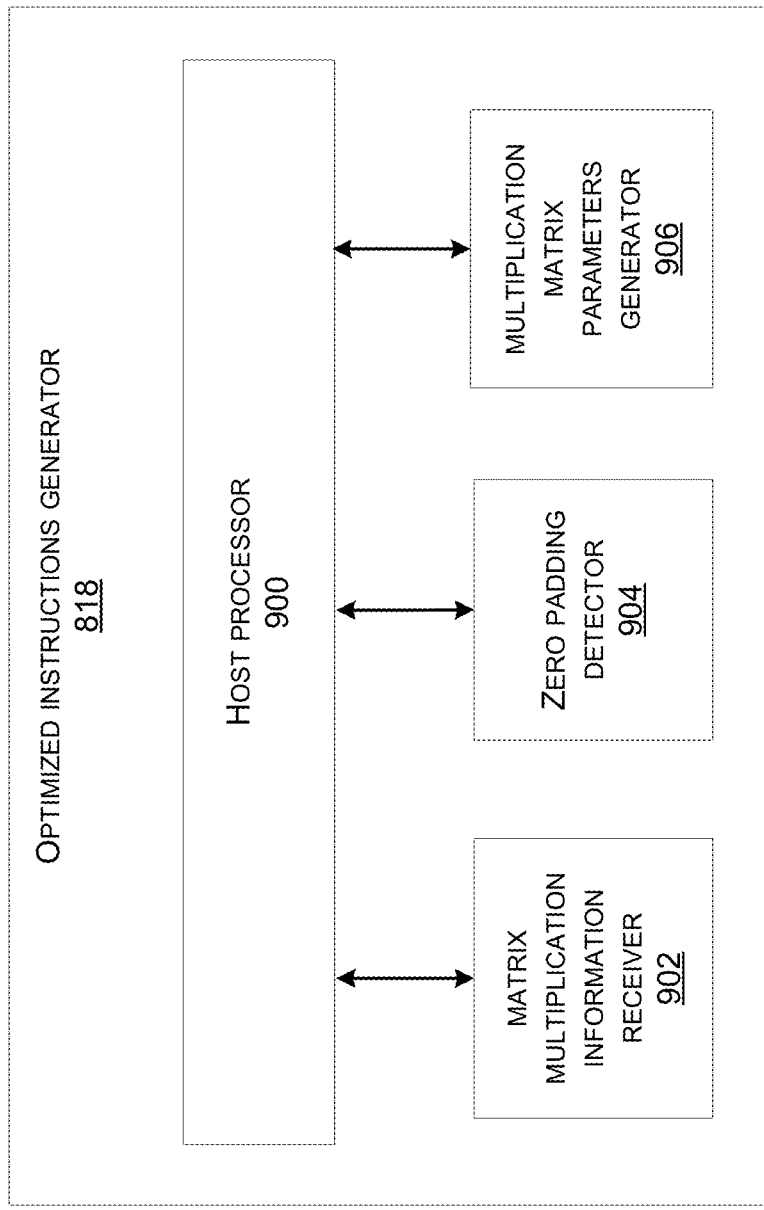
FIG. 9 illustrates an optimized instructions generator to perform convolution computations according to some embodiments.

FIG. 9 illustrates components of the optimized instructions generator 818 to generate parameters for matrix multiplication instructions, according to some embodiments.

The optimized instructions generator 818 may include a host processor 900 communicatively coupled to a matrix multiplication information receiver 902, a zero padding detector 904 and a multiplication matrix parameters generator 906. In various embodiments, the matrix multiplication information receiver 902, the zero padding detector 904, and the multiplication matrix parameters generator 906 may be implemented in software, hardware, or any suitable means. For example, in certain embodiments, the matrix multiplication information receiver 902, the zero padding detector 904, and the multiplication matrix parameters generator 906 may be stored in a memory coupled to the host processor 900 in the form of computer code executable by the host processor 900.

The matrix multiplication information receiver 902 may be configured to receive information associated with the input data element matrix and the weight matrix. In some implementations, the information may include dimensions for the input data element matrix and the weight matrix. The dimensions may include a height and a width of the respective matrix. In some embodiments, the information associated with the input data element matrix and the weight matrix may be provided by a user, e.g., based on the system specification. For example, the dimensions for the input data element matrix and the weight matrix may be programmed in one or more registers. Referring back to FIG. 4, the input data element matrix may be similar to the input data set 402 and the weight matrix may be similar to the filter 406. For example, the input data element matrix may include a 4×4 matrix and the weight matrix may include a 3×3 matrix.

The zero padding detector 904 may be configured to receive size information associated with the padding data. For example, the size information may include a number of padding elements around the perimeter of the input data element matrix. In some implementations, the zero padding detector 904 may be configured to receive information on whether padding is to be added to the input data element matrix. For example, a flag may be programmed to a first value to indicate that a padding is to be added, and to a second value to indicate that no padding is to be added. In some embodiments, adding the padding may correspond to making the output feature map the same size as the input feature map. Thus, the size information associated with the padding data may be determined accordingly to provide a padded input data element matrix. For example, the padded input data element matrix may be similar to the padded input data set 402p. In some implementations, the number of padding elements may be specified for each side (e.g., North, East, South, or West) of the input data element matrix. For example, the number of padding elements can be specified going clockwise from the North as [North, East, South, West]. The number of padding elements surrounding each side of the input data element matrix may be the same or different. For example, in one instance, the North and the South sides may include two layers of padding elements, and the East and the West sides may include one layer of the padding elements. In another instance, all four sides may include same number of padding elements. The padding elements may include zeros or any negligible values. In some implementations, a padding element may correspond to a pixel for an image. Referring back to FIG. 4, the padding may be similar to the padding 404. Thus, the size information may include twenty padding elements with one layer of padding elements on each side of the input data element matrix.

The multiplication matrix parameters generator 910 may be configured to generate parameters for the multiplication matrix. For example, the multiplication matrix parameters generator 910 may determine coordinates and dimensions for a respective multiplication matrix that corresponds to a subset of the padded input data element matrix and excludes the padding data. The multiplication matrix parameters generator 910 may determine the coordinates and dimensions for the respective multiplication matrix using the dimensions for the input data element matrix, the dimensions for the weight matrix, and the size information for the padding data. For example, the multiplication matrix parameters generator 910 may determine, for each weight value, padded coordinates and padded dimensions for the subset of the padded input data element matrix based on the effective dimensions of the input data element matrix with the padding data surrounding the input data element matrix. The padded coordinates may be relative to a top leftmost corner of the padded input data element matrix, and the padded dimensions may include the height and the width of the subset of the padded input data element matrix. The multiplication matrix parameters generator 910 may reassign the padded coordinates and the padded dimensions for the subset of the padded input data element matrix to provide the coordinates and the dimensions for the respective multiplication matrix such that the height and the width of the respective multiplication matrix do not extend into the padding data, and the coordinates are relative to a top leftmost corner of the input data element matrix.

For example, the multiplication matrix parameters generator 910 may adjust the coordinates and dimensions of a given subset of the padded input data element matrix for each weight value to avoid computations with the zero padding data as shown with reference to FIG. 6. The multiplication matrix may be similar to the multiplication matrices 702A, 702B, 702C, . . . , 702I for different weight values for different convolution passes, as discussed with reference to FIG. 7. The respective multiplication matrix may be used for performing a matrix multiplication with the respective weight value by the computation controller 804 as discussed with reference to FIG. 10. In some instances, for a three-dimensional input data set with a three-dimensional padding, the coordinates for the multiplication matrix generated by the multiplication matrix parameters generator 910 may include a height, a width and a depth. In some implementations, the multiplication matrix parameters generator 910 may utilize hardware means to determine and adjust the coordinates and the dimensions for the respective multiplication matrix, For example, the multiplication matrix parameters generator 910 may use zero detectors, counters, comparators, or any suitable circuit.

Figure 10:
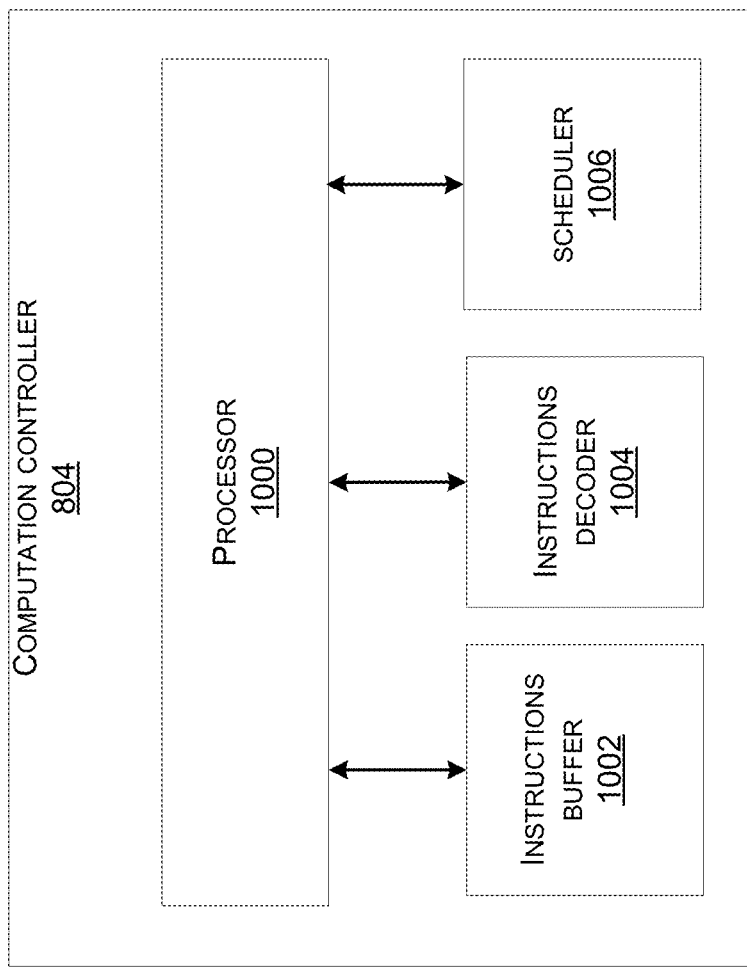
FIG. 10 illustrates components of a computation controller in some embodiments.

FIG. 10 illustrates components of the computation controller 804 in some embodiments.

The computation controller 804 may include a processor 1000 coupled to an instructions buffer 1002, an instruction decoder 1004 and a scheduler 1006. Components of the computation controller 804 may be implemented using hardware, software or a combination thereof.

The instructions buffer 1002 may be configured to store instructions obtained from the memory 822 via the interconnect 814. For example, the instructions may be generated by the optimized instructions generator 818 and stored in the memory 822 by the host device 816.

The instructions decoder 1004 may be configured to decode instructions stored in the instructions buffer 1002. The instructions may include opcodes which may be decoded to determine a type of the instruction. The type of instruction may generate appropriate controls which may be directed to various components of the neural network processor 802 accordingly. For example, the instructions for the computation engine 806 may include instructions to load weights, matrix multiply, and other relevant instructions.

The scheduler 1006 may be configured to schedule execution of the instructions decoded by the instructions decoder 1004. For example, the scheduler 1006 may first schedule execution of the instruction to load weights (LDWEIGHTS) in the computation engine 806 from the state buffer 808. Next, the scheduler 1006 may schedule execution of the instruction to perform matrix multiplication. The parameters for the matrix multiplications may be generated by the optimized instructions generator 818 to skip multiplications with the zero padding data according to some embodiments. Referring back to FIG. 7, the scheduler 1006 may schedule execution of the instructions to perform convolution of the filter 406 across the padded input data set 402*p* as discussed with reference to TABLE 2.

Figure 11:
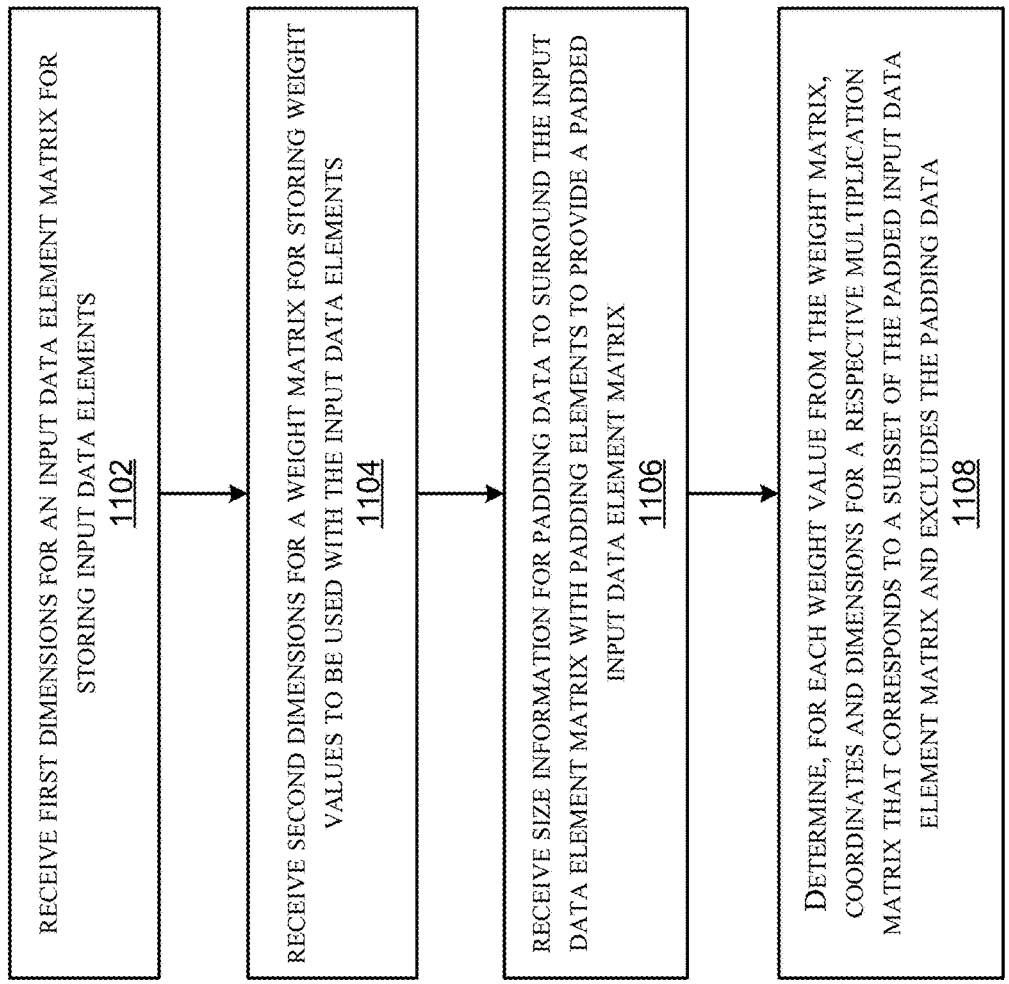
FIG. 11 illustrates a method for generating parameters for a matrix multiplication instruction which avoids computations with zero padding data according to some embodiments.

FIG. 11 illustrates a method 1100 for generating parameters for a matrix multiplication instruction which reduces or avoids computations with zero padding data according to some embodiments. The method 1100 may be executed by the optimized instructions generator 818 as discussed with reference to FIGS. 8 and 9. The host device 816 may be provided an image, an audio clip, a video clip, a text portion, or any other data to identify a pattern or an object. The optimized instructions generator 818 in the host device 818 may generate code (e.g., optimized code) that can be executed by the computation engine 806 to perform convolution computations, which do not include computations with zero padding data, to improve performance. Results of the computations can be stored in the state buffer 808 and can be provided to the host device 816 via the host interface 820. The host device 816 may use the results to make inferences about the pattern or the object.

In a step 1102, first dimensions for an input data element matrix may be received for storing input data elements. As discussed above, the input data elements may correspond to an image, an audio clip, a video clip, a text portion, or any other data which may be provided to the host device 816 for data processing. Referring back to FIG. 9, the matrix multiplication information receiver 902 of the optimized instructions generator 818 may receive the first dimensions for the input data element matrix for storing input data elements. For example, the input data element matrix may correspond to the input data set 402. The first dimensions may include a height (e.g., four) and width (e.g., four) of the input data set 402. The first dimensions for the input data element matrix may be provided by a user, e.g., based on the system specification.

In a step 1104, second dimensions for a weight matrix may be received for storing weight values to be used with the input data elements. The matrix multiplication information receiver 902 of the optimized instructions generator 818 may receive the second dimensions for the weight matrix for storing the weight values to be used with the input data elements. For example, the weight matrix may correspond to the filter 406. The weight values may have been predetermined based on supervised learning, unsupervised learning, or any other method suitable for determining convolutional filters. The second dimensions may include a height (e.g., three) and width (e.g., three) of the filter 406. The second dimensions for the weight matrix may be provided by the user, e.g., based on the system specification.

In a step 1106, size information for padding data to surround the input data element matrix with padding elements may be received to provide a padded input data element matrix. For example, the padding elements may include zero values. The zero padding detector 904 may receive the size information for the padding data to surround the input data element matrix with the padding elements to provide the padded input data element matrix. The padded input data element matrix may be similar to the padded input data set 402p. The size information may include a number of padding elements around the perimeter of the input data element matrix. In some implementations, the number of padding elements may be specified for each side (e.g., North, East, South, or West), of the input data element matrix. For example, the size information for the padding data corresponding to the padding 404 may indicate a number of zeros surrounding each side of the input data element matrix. The size information for the padding data may be provided by the user, e.g., based on the system specification.

In a step 1108, coordinates and dimensions for a respective multiplication matrix that correspond to a subset of the padded input data element matrix and excludes the padding data may be determined for each weight value from the weight matrix. The coordinates and dimensions may be determined using the first dimensions, the second dimensions, and the size information of the padding data. The multiplication matrix parameters generator 910 may adjust the coordinates and dimensions of a given subset of the padded input data set 402p for each weight value to avoid computations with the zero padding data. For example, for a given respective height and width of the padded input data element matrix and the weight matrix, the coordinates and dimensions of a respective multiplication matrix may be determined such that a height and a width of the respective multiplication matrix lies within the boundaries of the input data element matrix. The coordinates and dimensions for the respective multiplication matrix may be determined using software or hardware means. For example, the multiplication matrix parameters generator 910 may be in the form of computer code executable by the host processor 900, or may include suitable circuits, e.g., zero detectors, counters, comparators, etc.

In some embodiments, the multiplication matrix parameters generator 910 may determine, for each weight value, padded coordinates and padded dimensions for the given subset of the padded input data element matrix based on the effective dimensions of the input data element matrix with the padding data surrounding the input data element matrix. For example, the padded coordinates for the given subset may be specified relative to a top leftmost corner of the padded input data element matrix, which may correspond to a first row and a first column of the padded input data element matrix, similar to the top leftmost corner 600 of the padded input data set 402p. The multiplication matrix parameters generator 910 may reassign the padded coordinates and the padded dimensions for the given subset of the padded input data element matrix to provide the coordinates and the dimensions for the respective multiplication matrix such that the height and the width of the respective multiplication matrix do not extend into the padding data, and the coordinates are relative to the top leftmost corner of the input data element matrix. For example, the padded coordinates and the padded dimensions for the given tile of the padded input data element matrix may be reassigned such that the height and the width of the given subset do not extend into the padding 404, and the coordinates are relative to the top leftmost corner of the input data element matrix, which may correspond to a first row and a first column of the input data set 402, similar to the top leftmost corner 602 of the input data set 402.

The multiplication matrix parameters generator 910 may determine the coordinates and dimensions for the respective multiplication matrix to be used for performing a matrix multiplication with the respective weight value. For example, the respective multiplication matrix for each weight value corresponding to the filter 406 may be one of the multiplication matrices 702A, 702B, 702C, . . . , 702I, as discussed with reference to FIG. 7. Thus, certain embodiments can reduce the number of computations performed by the computation engine 806 by adjusting the dimensions of the respective multiplication matrix such that the padding data is avoided in multiplication computations. Skipping the computations with the zero padding data can improve the performance and lower the power consumption of the systolic array.

Figure 12:
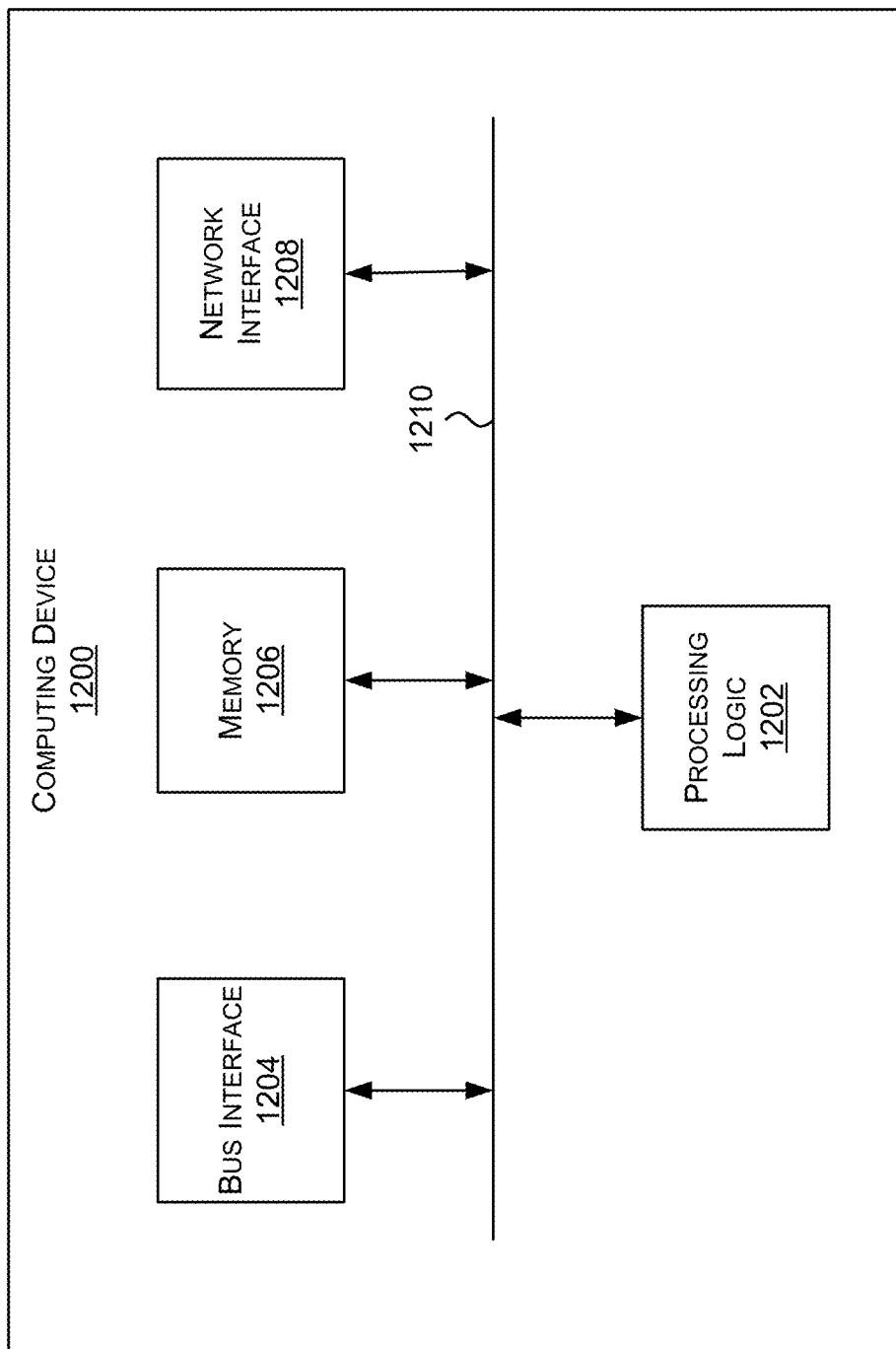
FIG. 12 illustrates an example of a computing device, according to certain aspects of the disclosure.

FIG. 12 illustrates an example of a computing device 1200. Functionality and/or several components of the computing device 1200 may be used without limitation with other embodiments disclosed elsewhere in this disclosure, without limitations. The computing device 1200 may perform computations to facilitate processing of a task. As an illustrative example, the computing device 1200 can be part of a server in a multi-tenant compute service system. Various hardware and software resources of the computing device 1200 (e.g., the hardware and software resources associated with provision of an image recognition service) can be allocated to a client upon request.

In one example, the computing device 1200 may include processing logic 1202, a bus interface 1204, memory 1206, and a network interface 1208. These components may be hardware modules, software modules, or a combination of hardware and software. In certain instances, components may be interchangeably used with modules or engines, without deviating from the scope of the disclosure. The computing device 1200 may include additional components, not illustrated here. In some implementations, the computing device 1200 may include fewer components. In some implementations, one or more of the components may be combined into one module. One or more of the components may be in communication with each other over a communication channel 1210. The communication channel 1210 may include one or more busses, meshes, matrices, fabrics, a combination of these communication channels, or some other suitable communication channel.

The processing logic 1202 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1)

caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1206. The processing logic 1202 may include functionalities similar to the optimized instructions generator 818 to generate parameters for matrix multiplication instructions that avoid multiplications with the zero padding data, according to some embodiments.

The access to the processing logic 1202 can be granted to a client to provide the personal assistant service requested by the client. For example, the computing device 1200 may host a virtual machine, on which an image recognition software application can be executed. The image recognition software application, upon execution, may access the processing logic 1202 to predict, for example, an object included in an image. As another example, access to processing logic 1202 can also be granted as part of bare-metal instance, in which an image recognition software application executing on a client device (e.g., a remote computer, a smart phone, etc.) can directly access the processing logic 1202 to perform the recognition of an image.

The memory 1206 may include either volatile or non-volatile, or both volatile and non-volatile types of memory. The memory 1206 may, for example, include random access memory (RAM), read only memory (ROM), Electrically Erasable Programmable Read-Only Memory (EEPROM), flash memory, and/or some other suitable storage media. In some cases, some or all of the memory 1206 may be internal to the computing device 1200, while in other cases some or all of the memory may be external to the computing device 1200. The memory 1206 may store an operating system comprising executable instructions that, when executed by the processing logic 1202, provides the execution environment for executing instructions providing networking functionality for the computing device 1200. The memory 1206 may also store, for example, software applications for performing artificial neural network computation. For example, memory 1206 may store software routines related to the computations of equations 1-19 above. In a case where processing logic 1202 is in the form of FPGA, memory 1206 may store netlists data representing various logic circuit components of processing logic 1202.

The bus interface 1204 may enable communication with external entities, such as a host device and/or other components in a computing system (e.g., the neural network processor 802), over an external communication medium. The bus interface 1204 may include a physical interface for connecting to a cable, socket, port, or other connection to the external communication medium. The bus interface 1204 may further include hardware and/or software to manage incoming and outgoing transactions. The bus interface 1204 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface 1204 may include the physical layer for any of these bus protocols, including a connector, power management, and error handling, among other things. In some implementations, the computing device 1200 may include multiple bus interface modules for communicating with multiple external entities. These multiple bus interface modules may implement the same local bus protocol, different local bus protocols, or a combination of the same and different bus protocols.

The network interface 1208 may include hardware and/or software for communicating with a network. This network interface 1208 may, for example, include physical connectors or physical ports for wired connection to a network, and/or antennas for wireless communication to a network. The network interface 1208 may further include hardware and/or software configured to implement a network protocol stack. The network interface 1208 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1200 may include multiple network interface modules, each configured to communicate with a different network. For example, in these implementations, the computing device 1200 may include a network interface module for communicating with a wired Ethernet network, a wireless 802.11 network, a cellular network, an Infiniband network, etc. In some embodiments, computing device 1200 may receive a set of parameters, such as the aforementioned weight vectors for generation of forget gate factor, input factor, output factor, etc. from a server through network interface 1208.

The various components and modules of the computing device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

Figure 13:
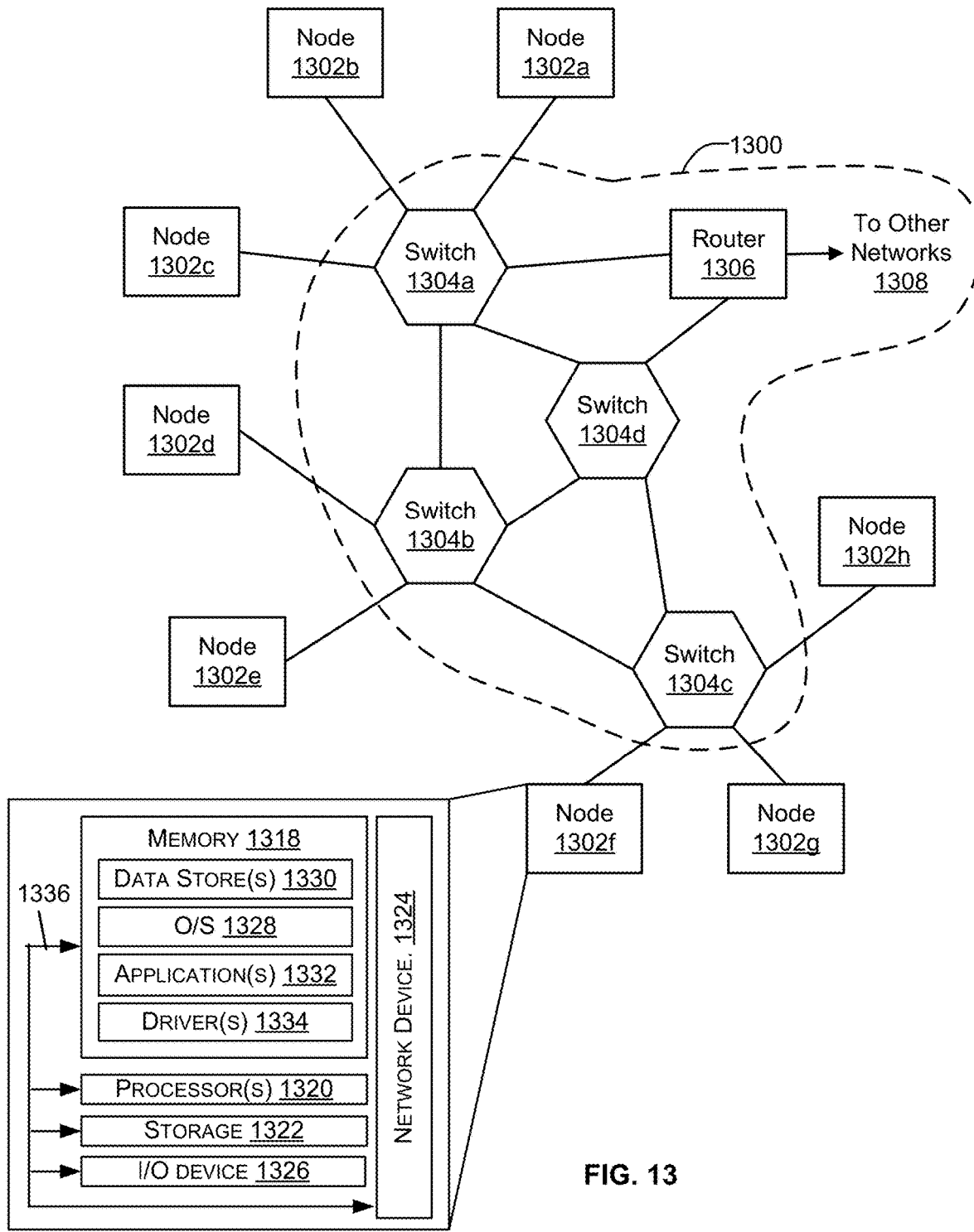
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of devices such as the computing device 1200 of FIG. 12. In certain embodiments, the network 1300 may be based on a switched architecture with point-to-point links. As illustrated in FIG. 13, the network 1300 includes a plurality of switches 1304a-1304d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers. One or more nodes 1302a-1302h may include functionalities of the optimized instructions generator 818 and/or the neural network processor 802.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device (s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices 1304. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network(s) 1300.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1204 may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    receiving, by a compiler, a padded input data element matrix that includes an input data element matrix at least partially surrounded by padding elements, wherein the input data element matrix stores input data elements;
    receiving, by the compiler, a weight matrix that stores weight values to be used with the input data elements;
    for each weight value from the weight values of the weight matrix:
        determining, by the compiler, coordinates and dimensions for a multiplication matrix within the padded input data element matrix to be used with the weight value; and
        reassigning, by the compiler, the coordinates and the dimensions for the multiplication matrix within the padded input data element matrix to exclude the padding elements;
    generating, by the compiler, compiled code to be executed by a computation engine having a systolic array having columns and rows of processing elements, the compiled code incorporating the reassigned coordinates and the reassigned dimensions; and
    performing, at the computation engine and based on executing the compiled code, matrix multiplications using the reassigned coordinates and the reassigned dimensions.

2. The method of claim 1, further comprising:
    for each weight value from the weight values of the weight matrix:
        multiplying the weight value with the multiplication matrix having the reassigned coordinates and the reassigned dimensions.

3. The method of claim 1, wherein the padding elements include zero values.

4. The method of claim 1, wherein the coordinates include a start address of the multiplication matrix within the input data element matrix.

5. The method of claim 1, wherein the coordinates and the dimensions for the multiplication matrix are determined based on dimensions for the padded input data element matrix.

6. The method of claim 1, wherein the coordinates and the dimensions for the multiplication matrix are reassigned based on an amount of padding associated with the padding elements surrounding the input data element matrix.

7. The method of claim 1, wherein the coordinates and the dimensions for the multiplication matrix are reassigned based on coordinates of the weight value within the weight matrix.

8. A system comprising:
    one or more processors; and
    a non-transitory computer-readable medium having instructions stored therein that, when executed by the one or more processors, cause the one or more processors to perform operations comprising:
        receiving, by a compiler, a padded input data element matrix that includes an input data element matrix at least partially surrounded by padding elements, wherein the input data element matrix stores input data elements;
        receiving, by the compiler, a weight matrix that stores weight values to be used with the input data elements;
        for each weight value from the weight values of the weight matrix:

determining, by the compiler, coordinates and dimensions for a multiplication matrix within the padded input data element matrix to be used with the weight value; and reassigning, by the compiler, the coordinates and the dimensions for the multiplication matrix within the padded input data element matrix to exclude the padding elements; and generating, by the compiler, compiled code to be executed by a computation engine having a systolic array having columns and rows of processing elements, the compiled code incorporating the reassigned coordinates and the reassigned dimensions;

wherein matrix multiplications using the reassigned coordinates and the reassigned dimensions are to be performed at the computation engine and based on executing the compiled code.

9. The system of claim 8, wherein the operations further comprise:

for each weight value from the weight values of the weight matrix:

multiplying the weight value with the multiplication matrix having the reassigned coordinates and the reassigned dimensions.

10. The system of claim 8, wherein the padding elements include zero values.

11. The system of claim 8, wherein the coordinates include a start address of the multiplication matrix within the input data element matrix.

12. The system of claim 8, wherein the coordinates and the dimensions for the multiplication matrix are determined based on dimensions for the padded input data element matrix.

13. The system of claim 8, wherein the coordinates and the dimensions for the multiplication matrix are reassigned based on an amount of padding associated with the padding elements surrounding the input data element matrix.

14. The system of claim 8, wherein the coordinates and the dimensions for the multiplication matrix are reassigned based on coordinates of the weight value within the weight matrix.

15. A non-transitory computer-readable medium having instructions stored therein that, when executed by the one or more processors, cause the one or more processors to perform operations comprising:

receiving, by a compiler, a padded input data element matrix that includes an input data element matrix at least partially surrounded by padding elements, wherein the input data element matrix stores input data elements;

receiving, by the compiler, a weight matrix that stores weight values to be used with the input data elements;

for each weight value from the weight values of the weight matrix:

determining, by the compiler, coordinates and dimensions for a multiplication matrix within the padded input data element matrix to be used with the weight value; and reassigning, by the compiler, the coordinates and the dimensions for the multiplication matrix within the padded input data element matrix to exclude the padding elements; and generating, by the compiler, compiled code to be executed by a computation engine having a systolic array having columns and rows of processing elements, the compiled code incorporating the reassigned coordinates and the reassigned dimensions;

wherein matrix multiplications using the reassigned coordinates and the reassigned dimensions are to be performed at the computation engine and based on executing the compiled code.

16. The non-transitory computer-readable medium of claim 15, wherein the operations further comprise:

for each weight value from the weight values of the weight matrix:

multiplying the weight value with the multiplication matrix having the reassigned coordinates and the reassigned dimensions.

17. The non-transitory computer-readable medium of claim 15, wherein the padding elements include zero values.

18. The non-transitory computer-readable medium of claim 15, wherein the coordinates include a start address of the multiplication matrix within the input data element matrix.

19. The non-transitory computer-readable medium of claim 15, wherein the coordinates and the dimensions for the multiplication matrix are determined based on dimensions for the padded input data element matrix.

20. The non-transitory computer-readable medium of claim 15, wherein the coordinates and the dimensions for the multiplication matrix are reassigned based on an amount of padding associated with the padding elements surrounding the input data element matrix.

* * * * *